United States Patent Office 2,899,395
Patented Aug. 11, 1959

2,899,395
REGENERATION OF COBALT SULFATE-CONTAINING CATALYST SOLUTIONS

Karl Büchner, Duisburg-Hamborn, Germany, assignor to Ruhrchemie Aktiengesellschaft, Oberhausen-Holten, Germany, a corporation of Germany No Drawing. Application June 17, 1953
Serial No. 362,424

Claims priority, application Germany July 19, 1952

5 Claims. (Cl. 252—411)

This invention relates to improvements in the regeneration of aqueous catalyst solutions containing cobalt salts.

The use of aqueous cobalt salt solutions as a catalyst for the catalytic addition of water gas to unsaturated carbon compounds such as olefins at elevated temperatures and pressures is known. Solutions of this type supply cobalt carbonyl hydrogen as the catalytically active material, especially in the presence of iron. When using cobalt sulfate in the formation of the catalyst, the anion of the aqueous salt solution, i.e., the sulfate ion, is first set free. The iron metal dissolves in the solution as ferrous sulfate and is present in the spent catalyst solution in quantities of about 7 grams per liter, while the solution has become poor in cobalt. The cobalt is expended by being dissolved in the end product of the synthesis, such as the aldehydes formed partially as cobalt carbonyl hydrogen and partially as dicobalt octacarbonyl. These cobalt compounds may be precipitated from the end product as hydroxides in an after-treatment with water under elevated pressure and temperature. Another part of the cobalt is expended by leaving the reaction vessel as cobalt carbonyl hydrogen together with the gas stream. If, for example, solutions of cobalt chloride or cobalt acetate are used, the formation of cobalt carbonyl hydrogen in the presence of metallic iron starts with the formation of ferrous chloride or ferrous acetate.

Aqueous cobalt salt solutions which shall be used, for example, in the oxo synthesis as catalyst, may be produced in the conventional manner as, for example, by dissolving solid cobalt salts or by adding basic cobalt carbonate to aqueous solutions of mineral acids or organic acids. Moreover, the magnesia salts as, for example, magnesium sulfate, which may be desired in the catalyst solution may directly be added. It is also possible, however, to work in such a manner that magnesium oxide or magnesium carbonate in addition to cobalt carbonate are added to the aqueous acid solution. After the dissolution of the metal carbonates and of the magnesium salts which, if necessary or desired, have also been added, the solution is separated by filtration from the constituents which remain undissolved. Thereafter, the solution is adjusted to the pH value desired by dilution and, if necessary, by further adding acids.

The concentration of the cobalt salt solutions used in accordance with the invention may range between 2 and 20 grams of cobalt and 5–30 grams of Mg per liter. Moreover, the solution may contain iron up to about 100% of the cobalt content without disturbing thereby, for example, an oxo synthesis carried out by means of solutions of this type. However, the iron dissolved in the form of salts is not able to initiate the formation of cobalt carbonyl hydrogen. Metallic iron is required to initiate this formation of cobalt carbonyl hydrogen. During the formation of the cobalt carbonyl hydrogen, this metallic iron converts into the iron salt of the acid used for the formation of the cobalt salt. For example, iron (II) sulfate, iron (II) chloride, iron (II) acetate or iron (II) propionate is formed in this way from the metallic iron present, depending on the acid used for dissolving the cobalt carbonate. This results in a continuous increase of the iron content of the catalyst solution while a corresponding decrease in the cobalt content occurs.

The metallic iron required for the formation of cobalt carbonyl hydrogen is suitably used in a form having a large surface area as, for example, in the form of iron powder, iron chips or thin iron sheets.

If the spent catalyst solutions are to be regenerated and reused, it is necessary to replace the cobalt and separate the excess iron salt formed. If the separation of the iron salts from the cobalt sulfate solution were attempted by preliminary precipitation with soda solution in a conventional manner after conversion into the trivalent form, a quantity of sodium sulfate equivalent to the iron would enter the cobalt sulfate solution. Since alkali sulfates have an unfavorable effect on the cobalt solution catalyst, as, for example, on a cobalt sulfate-magnesium sulfate solution in the aldehyde synthesis, it is not possible to separate the iron in this manner.

One object of this invention is a method for the regeneration of spent aqueous cobalt salt catalyst solutions for the catalytic addition of water gas to unsaturated carbon compounds which allows the replenishment of the cobalt and the removal of the excess iron in a single operation in a simple and highly efficient manner. The catalytic addition of water gas to unsaturated carbon compounds is known as the oxo synthesis and may be effected, for example, by the process of the U.S. Patent 2,327,066. This, and still further objects, will become apparent from the following description:

It has now been found that it is possible in one operational step to practically quantitatively remove the excess iron from the spent solution and to at the same time make up the lacking cobalt content. This is effected by mixing the spent catalyst solutions with a quantity of cobalt carbonate which is at least equivalent to the loss in cobalt, and by vigorously stirring the solution while blowing in air. The regeneration, according to the invention, of the cobalt salt solutions is effected at temperatures of 0–70° C. and preferably of 20–30° C. while any pressure may be used, the preferred pressure being atmospheric. The stirring or agitating when blowing in air may be effected by the blown-in air itself or may be effected in another manner. The air is suitably blown in at normal temperature. In this manner a regenerated solution is obtained which is at least equivalent in activity to the starting cobalt sulfate catalyst solution such as a cobalt sulfate-magnesium sulfate solution and may again be charged to the synthesis which is the aldehyde synthesis without further pretreatment.

In the regeneration, according to the invention, of aqueous cobalt salt solutions there is added so much cobalt carbonate that the total cobalt content will be again as high as the cobalt content in the starting solution. Sometimes, some more iron is precipitated than corresponds to the cobalt carbonate added. This phenomenon is due to the fact that already during the transition of ferrous salts into ferric salts a separation of ferric salts in flocks occurs. Ferrous salts, as is known, are still dissolved at a pH value where the corresponding ferric compounds will already separate as precipitate. The complete removal of the iron in the regeneration of cobalt salt solutions is not necessary since, as was mentioned before, a content of iron in the cobalt salt solutions will not be troublesome.

The following examples are given by way of illustration and not limitation:

Example 1

A cobalt sulfate-magnesium sulfate solution containing per liter 15.5 grams Co
    25.0 grams MgO
    0.6 gram Fe was used in 10 batches for the addition of water gas to a hydrocarbon mixture containing a $C_{12}$ olefin (aldehyde synthesis or oxo synthesis) effected at 150° C. and a gas pressure of about 200 kg./sq. cm. and in the presence of metallic iron powder.

All the above metal components were in the form of sulfates. The pH value of the solution was 3.5.

After the use, the solution contained per liter 10.52 grams cobalt
    23.7 grams MgO
    6.7 grams Fe The pH value was 5.8.

40 liters of this solution were mixed with 2 kg. moist precipitated cobalt carbonate which contained 15% Co. The mixture was intensively stirred for about 12 hours while passing in air. Then the precipitated iron deposit was separated from the salt solution by filtration. The regenerated salt solution contained per liter 15.5 grams Co
    24.0 grams MgO
    0.05 gram Fe The pH value was 5.5.

Example 2

An aqueous cobalt chloride solution was six times used for a catalytic addition of water gas to a mixture of $C_{11}$ olefins and $C_{11}$ paraffins carried out under pressure. The solution had been prepared in the following manner:

80 grams of $CoCl_2 \cdot 6H_2O$ and 160 grams of $$MgCl_2 \cdot 6H_2O$$

were dissolved in 1000 cc. of water. This solution was mixed with 5500 cc. of a hydrocarbon fraction containing olefins and paraffins the boiling point of which ranged between 180 and 200° C. The solution was used six times as catalyst solution for the water gas addition with the addition each time of 10 grams of metallic iron in the pulverized form. Thereafter, the solution contained per liter 15.2 grams of Co, 18.7 grams of Mg and 6.1 grams of Fe in the form of chlorides.

For the regeneration, this solution was mixed with 35 grams of moist precipitated cobalt carbonate which contained 14.0% of Co. The mixture was then stirred for 10 hours at about 30° C. while passing in air. Thereafter, the solution was separated by filtration from the precipitated iron deposit resulting in a solution which contained per liter 20.0 grams of Co, 18.5 grams of Mg and 0.02 gram of Fe in the form of chlorides. This solution, when further used as catalyst for the oxo synthesis, had exactly the same activity as the solution initially used.

Example 3

2.4 grams of cobalt acetate were dissolved in 50 cc. of water. This solution was five times used as catalyst for the addition of water gas to 200 cc. of the olefinic hydrocarbon mixture used in Example 2. The oxo synthesis was effected in a pressure vessel lined with silver plate, in which a thin iron plate was present. Thereafter, the turbid, nearly colorless solution separated was stirred for 6 hours with 2 grams moist cobalt carbonate which contained 15% Co while passing in air. The original volume of 50 cc. was restored by the addition of water. Thereafter, the salt solution was separated by filtration from the precipitate and used again for the oxo synthesis. The activity of the regenerated catalyst solution was exactly the same as that of the initial solution.

I claim:

1. Process for the regeneration of aqueous catalyst solutions containing cobalt salts, the cobalt being present in said solutions in amounts of 2–20 g./l which catalyst solutions have been used for the catalytic addition of water gas to unsaturated carbon compounds in the presence of iron, which comprises adding to the spent catalyst solution which in its spent condition contains 2–20 g./l of iron in the form of its sulfate at 0–70° C. a quantity of cobalt carbonate equivalent to the loss in cobalt and stirring the solution while blowing in air to produce iron carbonate and cobalt sulfate.

2. Process according to claim 1 in which the cobalt salt consists of cobalt sulfate.

3. Process according to claim 1, in which stirring is effected by the air blown in.

4. Process according to claim 1, in which aqueous catalyst solution for use for the catalytic addition of water gas to unsaturated carbon compound in the presence of iron contains in addition 5–30 g. of magnesium per liter.

5. Process according to claim 1, in which said cobalt carbonate addition is made at 20–30° C.

References Cited in the file of this patent

UNITED STATES PATENTS

| | | |
|---|---|---|
| 2,381,659 | Frey | Aug. 7, 1945 |
| 2,416,049 | Foster | Feb. 18, 1947 |
| 2,518,354 | Meinert et al. | Aug. 8, 1950 |

OTHER REFERENCES

Kolthoff and Sandell: "Textbook of Quant. Inorg. Anal." pub. by the Macmillan Co. (1943), pp. 70–2.